(12) United States Patent
Ge et al.

(10) Patent No.: US 7,778,648 B2
(45) Date of Patent: Aug. 17, 2010

(54) METHOD FOR HANDLING DEFERRED LOCATION REQUEST

(75) Inventors: Zhengkai Ge, Shenzhen (CN); Xiaoqin Duan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 613 days.

(21) Appl. No.: 11/782,493

(22) Filed: Jul. 24, 2007

(65) Prior Publication Data

US 2007/0287412 A1    Dec. 13, 2007

Related U.S. Application Data

(63) Continuation of application No. PCT/CN2005/001994, filed on Nov. 25, 2005.

(30) Foreign Application Priority Data

Jan. 25, 2005    (CN)   .................. 2005 1 0007176

(51) Int. Cl.
*H04W 24/00*    (2009.01)
(52) U.S. Cl. ............... 455/456.1; 455/456.3; 455/456.5
(58) Field of Classification Search ............... 455/456.1, 455/456.3, 456.5
See application file for complete search history.

(56) References Cited

U.S. PATENT DOCUMENTS 5,736,964 A    4/1998    Ghosh et al.

(Continued)

FOREIGN PATENT DOCUMENTS

CN    1152356 A    6/1997

(Continued)

OTHER PUBLICATIONS

State Intellectual Property Office of the People'S Republic of China, Written Opinion of the International Searching Authority in International Patent Application No. PCT/CN2005/001994 (Jan. 19, 2006).

(Continued)

*Primary Examiner*—Barry W Taylor
(74) *Attorney, Agent, or Firm*—Leydig, Voit & Mayer, Ltd.

(57) ABSTRACT

A method for handling a Deferred Location Request, including: a Location Service (LCS) Client initiating a Deferred Location Request for a target UE to a Requesting-Gateway Mobile Location Center (R-GMLC), the R-GMLC forwarding the Deferred Location Request to a Home-GMLC (H-GMLC), the H-GMLC assigning a Reference Number for the Deferred Location Request, and sending the Deferred Location Request to a Core Network (CN) via a Visited-GMLC (V-GMLC); when a deferred event occurs, the CN submitting a target UE location report and the Reference Number to the H-GMLC via the V-GMLC, the H-GMLC returning the target UE location report to the LCS Client via the R-GMLC. Since the H-GMLC is the home GMLC of the target UE, the Reference Number assigned by the H-GMLC may ensure that different Deferred Location Requests initiated for a same target UE may be exclusively differentiated, such that Deferred Location Requests for the same target UE initiated by the LCS Client through different R-GMLCs may be normally processed, which effectively solves the conflict in the handling process of an LCS and satisfies the demands of service operations.

22 Claims, 9 Drawing Sheets

U.S. PATENT DOCUMENTS

| | | |
|---|---|---|
| 6,466,788 B1 | 10/2002 | Carlsson |
| 7,660,590 B2 * | 2/2010 | Timiri et al. ............. 455/456.3 |
| 2004/0253964 A1 * | 12/2004 | Zhu ........................ 455/456.3 |
| 2006/0099960 A1 | 5/2006 | Duan |
| 2007/0243884 A1 * | 10/2007 | Nyu ........................ 455/456.2 |

FOREIGN PATENT DOCUMENTS

| | | |
|---|---|---|
| CN | 1336089 A | 2/2002 |
| CN | 1518369 A | 8/2004 |
| CN | 1568075 A | 1/2005 |
| WO | WO 03/061322 A1 | 7/2003 |

OTHER PUBLICATIONS

3rd Generational Partnership Project, "Technical Specification Group Services and System Aspects; Functional stage 2 description of Location Services (LCS) (Release 6)" (3GPP TS 23.271 V6.10.0) (Dec. 2004).

* cited by examiner

METHOD FOR HANDLING DEFERRED LOCATION REQUEST

This application is a continuation of International Patent Application No. PCT/CN2005/001994, filed Nov. 25, 2005, which claims priority to Chinese Patent Application No. 200510007176.0, filed Jan. 25, 2005, all of which are hereby incorporated by reference.

FIELD OF THE TECHNOLOGY

The present invention relates to locating technologies, and more particularly, to a method for handling a Deferred Location Request.

BACKGROUND OF THE INVENTION

Location Service (LCS) in a mobile communication network is a service that obtains location information of a target User Equipment (UE) using locating technologies. The target UE refers to a UE which is located by the mobile communication network. The location information may be longitude and latitude information in geography, or the location information of a local street. The location information obtained by the mobile communication network may be provided for the target UE, used for locating the target UE itself. The location information may also be provided for the communication network, used for area-based charging or implementing operation and maintenance functions. Furthermore, the location information may be provided for other user terminals requesting the location information of the target UE, e.g., institutions or individuals, and applied to value-added services. Therefore, the LCS is widely used in many scenarios, such as emergency rescue, vehicle navigation, intelligent traffic system, work dispatch, team management, inquiry of mobile yellow page, and enhancing network performance, etc.

Corresponding descriptions on service characteristics and system architecture of the LCS have been given in 3rd Generation Partnership Project (3GPP). FIG. 1 shows a schematic diagram illustrating a logical architecture implementing the LCS. As shown in FIG. 1, an LCS Client 101 requests location information of a target UE 103 via a network 102 including an LCS system, and the process includes an authorization of the LCS Client 101 implemented by the network 102 including the LCS system, to verify whether the LCS Client 101 is qualified to request the location information from the target UE 103. If the LCS Client 101 passes the authorization by the network 102, the network 102 accepts the location request for the target UE 103 initiated by the LCS Client, the network 102 locates the target UE 103 and provides location information of the target UE 103 for the LCS Client 101. Otherwise, the network 102 including the LCS system rejects the location request for the target UE 103 initiated by the LCS Client 101.

Functional and logical entities capable of the LCS functions in the LCS system include a Gateway Mobile Location Center (GMLC), a Home Location Register/Home Subscriber Server (HLR/HSS), a Core Network (CN) and a Radio Access Network (RAN). The GMLC further includes a Requesting-GMLC (R-GMLC), a Home-GMLC (H-GMLC) and a Visited-GMLC (V-GMLC). The R-GMLC refers to a GMLC that receives a location request for the target UE from a LCS Client. The H-GMLC refers to a home GMLC of the target UE. The V-GMLC refers to a severing-GMLC of target UE, i.e., the GMLC where the target UE is located. The R-GMLC, the H-GMLC and the V-GMLC may be a same physical entity, or different physical entities. The CN may be a Mobile Switching Center (MSC), or a Serving GPRS Support Node (SGSN).

A handling process of a Deferred Location Request is described in the 3GPP. The Deferred Location Request refers to that, a LCS Client requests the LCS system to provide location information of a target UE in a future time or when an specified event happens, i.e., after the LCS system receives a location request initiated by the LCS Client for the target UE, it defers for a period of time and will not provide the location information of the target UE for the LCS Client until being triggered by the specified event.

FIG. 2 is a flowchart illustrating a handling process of a target UE Available Deferred Location Request. As shown in FIG. 2, the handling process of the target UE Available Deferred Location Request includes the following steps.

Step 201: an LCS Client sends an LCS Service Request, carrying a target UE identifier, a target UE available indication and a specified event to the R-GMLC. The LCS Service Request may further carry Quality of Service (QoS) information to indicate the QoS information that the obtained location information of the target UE must satisfy.

Step 202~Step 203: Upon receiving the LCS Service Request, the R-GMLC assigns a Reference Number for the Deferred Location Request, then forwards the LCS Service Request carrying the target UE identifier, the specified event and the Reference Number to the H-GMLC. Upon receiving the LCS Service Request, the H-GMLC forwards the LCS Service Request carrying the target UE identifier, the specified event, the Reference Number and H-GMLC address information, to the V-GMLC.

Step 204: Upon receiving the LCS Service Request, the V-GMLC sends a Provide Subscriber Location request message, carrying the target UE identifier, the specified event, the Reference Number and the H-GMLC address information, to the CN. Upon receiving the Provide Subscriber Location request message, if the CN supports the Deferred Location Request and a security/privacy check succeeds, proceed to step 205; if the CN does not support the Deferred Location Request or the security/privacy check fails, the CN returns a Provide Subscriber Location Return Error message with a cause to the V-GMLC. The Provide Subscriber Location Return Error message carries the Reference Number. The V-GMLC returns a failure message carrying the Reference Number to the H-GMLC, the H-GMLC returns a failure message carrying the Reference Number to the R-GMLC, and the R-GMLC rejects the location request for the target UE initiated by the LCS Client. Then the procedure is over.

Step 205~Step 208: The CN returns a Provide Subscriber Location ACK carrying the Reference Number to the V-GMLC to notify the V-GMLC that the Deferred Location Request was successfully accepted. The CN may record charging information for the accepted Deferred Location Request. Upon receiving the Provide Subscriber Location ACK, the V-GMLC sends an LCS Service Response carrying the Reference Number to the H-GMLC according to the H-GMLC address information to notify the H-GMLC that the Deferred Location Request was successfully accepted. The V-GMLC may record charging information for the accepted Deferred Location Request. Upon receiving the LCS Service Response, the H-GMLC returns the LCS Service Response carrying the Reference Number to the R-GMLC to notify the R-GMLC that the Deferred Location Request was successfully accepted. The H-GMLC may record charging information for the accepted Deferred Location Request. Upon receiving the LCS Service Response, the R-GMLC returns the LCS Service Response carrying the Reference Number to the LCS Client to notify the LCS Client that the Deferred Location Request was successfully accepted. The R-GMLC may record charging information for the accepted Deferred Location Request.

Step 209: The CN detects whether the specified event has happened, if the specified event has happened, proceed to step 210. Otherwise, return to step 209.

Step 210: The CN cooperates with the RAN to implement the Location Procedure for the target UE.

Step 211: After obtaining a location estimate of the target UE, the CN sends a Subscriber Location Report carrying the Reference Number, the H-GMLC address information and the location estimate to the V-GMLC. The corresponding relationship between the returned location estimate and the Deferred Location Request is identified by the Reference Number.

Step 212: Upon receiving the Subscriber Location Report, the V-GMLC sends a Subscriber Location Report ACK to the CN to notify the CN that the Subscriber Location Report was successfully received.

Step 213: Upon receiving the Subscriber Location Report, the V-GMLC sends an LCS Service Response carrying the Reference Number and the location estimate to the H-GMLC according to the H-GMLC address information. The corresponding relationship between the returned location estimate of the target UE and the Deferred Location Request is identified by the Reference Number.

Step 214: Upon receiving the LCS Service Response, the H-GMLC may request to authorize the LCS Client to ensure that the location estimate of the target UE provided for the LCS Client is within the authorization of the LCS Client. If the LCS Client passes the authorization, proceed to step 215. Otherwise, the H-GMLC returns a check failure message carrying the Reference Number to the R-GMLC. The R-GMLC rejects the Deferred Location Request initiated by the LCS Client. Then the procedure is over.

Step 215~step 216: The H-GMLC sends the LCS Service Response carrying the Reference Number and the location estimate of the target UE to the R-GMLC. The corresponding relationship between the returned location estimate of the target UE and the Deferred Location Request is identified by the Reference Number. Upon receiving the LCS Service Response, the R-GMLC sends the LCS Service Response carrying the Reference Number and the location estimate of the target UE to the LCS Client. There is no sequential requirement on the executing time of Step 212 and step 213~step 216.

Also, there is no sequential requirement on the executing time of Step 205~Step 208 and step 209~step 216.

If the target UE moves to a new CN during the above process, the H-GMLC will send a specified event to the new CN via the V-GMLC, and the process may start with Step 203.

In addition, the 3GPP allows an LCS Client to request the LCS system to periodically provide location information of a target UE, i.e., the LCS Client defines a start time and a stop time as well as a periodical logic to request the LCS system to provide location information of the target UE according to the periodical logic during the time period. A Periodical Location Request may be regarded as a special Deferred Location Request.

FIG. 3 is a flowchart illustrating a handling process of a Periodical Location Request. As shown in FIG. 3, the handling process of the Periodical Location Request includes the following steps.

Step 301: an LCS Client sends an LCS Service Request to the R-GMLC, requesting the LCS system to locate the target UE periodically. The LCS Service Request carries a target UE identifier, a start time, a stop time, a time interval for locating the target UE and other related information.

Step 302: Upon receiving the LCS Service Request, the R-GMLC starts a Periodical Timer according to the related information to locate the target UE periodically.

Step 303: The R-GMLC assigns a Reference Number for the Periodical Location Request, and then sends the LCS Service Request carrying the target UE identifier and the Reference Number to the H-GMLC. Upon receiving the LCS Service Request, the H-GMLC sends the LCS Service Request carrying the target UE identifier, the Reference Number and the H-GMLC address information to the V-GMLC.

Step 304~Step 305: Upon receiving the LCS Service Request, the V-GMLC sends a Provide Subscriber Location request to the CN. Upon receiving the Provide Subscriber Location request, the CN cooperates with the RAN to implement the Location Procedure for the target UE.

Step 306~Step 307: Upon obtaining a location estimate of the target UE, the CN sends a Provide Subscriber Location ACK carrying the location estimate of the target UE to the V-GMLC. Upon receiving the Provide Subscriber Location ACK, the V-GMLC sends an LCS Service Response carrying the Reference Number and the location estimate of the target UE to the H-GMLC according to the H-GMLC address information. The corresponding relationship between the returned location estimate of the target UE and the Periodical Location Request is identified by the Reference Number. Upon receiving the LCS Service Response, the H-GMLC sends the LCS Service Response carrying the Reference Number and the location estimate of the target UE to the R-GMLC. The corresponding relationship between the returned location estimate of the target UE and the Periodical Location Request is identified by the Reference Number. Upon receiving the LCS Service Response, the R-GMLC sends the LCS Service Response carrying the Reference Number and the location estimate of the target UE to the LCS Client.

Step 308~Step 312: If the Periodical Timer expires, i.e., reaching a time period of the Periodical Location Request, the subsequent steps include: the R-GMLC sends an LCS Service Request carrying the target UE identifier and the Reference Number to the H-GMLC. Upon receiving the LCS Service Request, the H-GMLC sends the LCS Service Request carrying the target UE identifier, the Reference Number and the H-GMLC address information to the V-GMLC.

The handling process of each subsequent time period is basically the same as the above steps.

In addition, the Periodical Location Request may be combined with a Deferred Location Request, i.e., a Combined Periodical and UE Available Deferred Location Request. The handling process is defined in the 3GPP based on the Periodical Location Request and the target UE Available Deferred Location Request, as shown in FIG. 4:

Step 401: an LCS Client sends an LCS Service Request to the R-GMLC, requesting the LCS system to provide location information of a target UE. The LCS Service Request carries a target UE identifier and a specified event to locate the target UE, e.g., locating the target UE as soon as it attaches to the mobile network. The LCS Service Request also carries periodical logic, i.e., a start time, a stop time and a time interval to locate the target UE.

Step 402: Upon receiving the LCS Service Request, the R-GMLC starts a Periodical Timer according to related information to start locating the target UE periodically.

Step 403: The R-GMLC assigns a Reference Number for the Periodical Location Request, and then sends the LCS Service Request carrying the target UE identifier, the specified event and the Reference Number to the H-GMLC. Upon receiving the LCS Service Request, the H-GMLC sends the LCS Service Request carrying the target UE identifier, the specified event, the Reference Number and the H-GMLC address information to the V-GMLC.

Step 404~Step 406: Upon receiving the LCS Service Request, the V-GMLC sends a Provide Subscriber Location carrying the target UE identifier, the specified event, the Reference Number and the H-GMLC address information to the CN. Upon receiving the Provide Subscriber Location, the CN returns a Provide Subscriber Location ACK carrying the Reference Number to the V-GMLC to notify the V-GMLC that the Combined Periodical and target UE Available Deferred Location Request was successfully accepted. The CN may record charging information for the accepted Combined Periodical and target UE Available Deferred Location Request. Upon receiving the Provide Subscriber Location ACK, the V-GMLC sends an LCS Service Response carrying the Reference Number to the H-GMLC according to the H-GMLC address information to notify the H-GMLC that the Combined Periodical and target UE Available Deferred Location Request was successfully accepted. The V-GMLC may record charging information for the accepted Combined Periodical and target UE Available Deferred Location Request. Upon receiving the LCS Service Response, the H-GMLC sends the LCS Service Response carrying the Reference Number to the R-GMLC to notify the R-GMLC that the Combined Periodical and target UE Available Deferred Location Request was successfully accepted. The H-GMLC may record charging information for the accepted Combined Periodical and target UE Available Deferred Location Request. Upon receiving the LCS Service Response, the R-GMLC sends the LCS Service Response carrying the Reference Number to the LCS Client to notify the LCS Client that the Combined Periodical and target UE Available Deferred Location Request was successfully accepted. The R-GMLC may record charging information for the accepted Combined Periodical and target UE Available Deferred Location Request.

Step 407: When the Periodical Timer expires, if the R-GMLC is in a state of waiting for the CN to return the location estimate of the target UE, proceed to step 408a. Otherwise, proceed to step 408b.

Step 408a: The R-GMLC sends an LCS Service Response carrying the Reference Number to the LCS Client to notify the LCS Client that no location information of the target UE may be provided for the moment.

Step 409a: The CN detects whether the specified event has happened. If the specified event has happened, proceed to step 410a. Otherwise, return to step 409a.

Step 410a: The CN cooperates with the RAN to implement the Location Procedure for the target UE.

Step 411a: Upon obtaining the location estimate of the target UE, the CN sends a Subscriber Location Report carrying the Reference Number, the H-GMLC address information and the location estimate of the target UE to the V-GMLC. The corresponding relationship between the returned location estimate of the target UE and the Combined Periodical and target UE Available Deferred Location Request is identified by the Reference Number.

Step 412a: Upon receiving the Subscriber Location Report, the V-GMLC sends a Subscriber Location Report ACK to the CN to notify the CN that the Subscriber Location Report was successfully received.

Step 413a: Upon receiving the Subscriber Location Report, the V-GMLC sends an LCS Service Response carrying the Reference Number and the location estimate of the target UE to the H-GMLC according to the H-GMLC address information. The corresponding relationship between the returned location estimate of the target UE and the Combined Periodical and target UE Available Deferred Location Request is identified by the Reference Number. Upon receiving the LCS Service Response, the H-GMLC sends the LCS Service Response carrying the Reference Number and the location estimate of the target UE to the R-GMLC. The corresponding relationship between the returned location estimate of the target UE and the Combined Periodical and target UE Available Deferred Location Request is identified by the Reference Number. Upon receiving the LCS Service Response, the R-GMLC sends the LCS Service Response carrying the Reference Number and the location estimate of the target UE to the LCS Client.

Step 408b~Step 410b: The R-GMLC sends an LCS Service Request carrying the target UE identifier and the Reference Number to the H-GMLC. Upon receiving the LCS Service Request, the H-GMLC sends the LCS Service Request carrying the target UE identifier, the Reference Number and the H-GMLC address information to the V-GMLC. The subsequent process is the same as Step 404~Step 406.

Step 411b: The specified event is satisfied.

Step 412b~Step 415b are the same as Step 410a Step 413a.

The process of each subsequent time period is basically the same as the above process.

The 3GPP also defines a Location Request procedure for a change of area event. The change of area type location request refers to that an LCS Client specifies an area event in advance, such as a target area range and a location event report trigger, e.g., when the target UE enters into, leaves or is inside the target area, report a location area event to the LCS Client. The LCS system sends information such as the location area event to the target UE, and the target UE stores the received information. At the same time, the monitoring upon the target UE is started. When detecting a location area event has happened, e.g., the target UE enters into, leaves or is inside the target area, the target UE sends a location area event report to the LCS system, then the LCS system forwards the location area event report to the corresponding LCS Client to notify the LCS Client that the requested location area event has happened. The change of area type location request may be regarded as a kind of the Deferred Location Request.

FIG. 5 is a flowchart illustrating a handling process of a change of area type location request. As shown in FIG. 5, the handling process of the change of area type location request includes the following steps:

Step 501: an LCS Client sends an LCS Service Request to the R-GMLC. The LCS Service Request carries a target UE identifier and a location area event, e.g., a specified target area and a location event report trigger. The location area event may be reported when the target UE enters into, leaves or is inside the specified target area.

Step 502~Step 503: Upon receiving the LCS Service Request, the R-GMLC assigns a Reference Number for the change of area type location request, then forwards the LCS Service Request carrying the target UE identifier, the location area event and the Reference Number to the H-GMLC. Upon receiving the LCS Service Request, the H-GMLC forwards the LCS Service Request carrying the target UE identifier, the location area event, the Reference Number and the H-GMLC address information, to the V-GMLC.

Step 504: Upon receiving the LCS Service Request, the V-GMLC sends a Provide Subscriber Location request message carrying the target UE identifier, the location area event, the Reference Number and the H-GMLC address information to the CN.

Step 505: Upon receiving the Provide Subscriber Location, the CN determines whether both the CN and the target UE support the change of area type location request, and implements a security/privacy check. If both the CN and the target UE support the change of area type location request and the security/privacy check succeeds, the CN detects whether the target UE is in an idle mode. If the target UE is in the idle mode, the CN implements paging, authentication the target UE and ciphering for the target UE, then proceeds to step 506; if either the CN or the target UE does not support the change of area type location request, or the security/privacy check fails, the CN returns a Provide Subscriber Location Return Error message with a suitable cause to the V-GMLC. Then, the V-GMLC returns a failure message to the H-GMLC, the H-GMLC returns a failure message to the R-GMLC, and the R-GMLC rejects the location request initiated by the LCS Client. Then the procedure is over.

Step 506~Step 507: The CN sends a Location Area Event Invoke message carrying the location area event and the Reference Number to the target UE via the RAN. Upon receiving the Location Area Event Invoke, if the target UE supports the change of area type location request, the target UE stores the location area event as well as the Reference Number. Then the target UE starts a related application program of its own, and monitors the occurrence of the location area event. The target UE sends a Location Area Event Invoke ACK to the CN to notify the CN that the change of area type location request was successfully accepted and processed, then proceed to step 508. If the target UE does not support the change of area type location request, it returns a Location Area Event Invoke ACK with a suitable cause to the CN. Then the CN returns a Provide Subscriber Location Return Error message with a suitable cause to the V-GMLC, the V-GMLC returns a failure message to the H-GMLC, H-GMLC returns a failure message to the R-GMLC, and the R-GMLC rejects the location request for the target UE initiated by the LCS Client. Then the procedure is over.

Step 508~Step 511: upon receiving the Location Area Event Invoke ACK, the CN sends a Provide Subscriber Location ACK to the V-GMLC to notify the V-GMLC that the change of area type location request was successfully accepted by the target UE, and the CN may record charging information for the accepted change of area type location request. Upon receiving the Provide Subscriber Location ACK, the V-GMLC sends an LCS Service Response to the H-GMLC to notify the H-GMLC that the change of area type location request was successfully accepted by the target UE, and the V-GMLC may record charging information for the accepted change of area type location request. Upon receiving the LCS Service Response, the H-GMLC sends the LCS Service Response to the R-GMLC to notify the R-GMLC that the change of area type location request was successfully accepted by the target UE, and the H-GMLC may record charging information for the accepted change of area type location request. Upon receiving the LCS Service Response, the R-GMLC sends the LCS Service Response carrying the Reference Number to the LCS Client to notify the LCS Client that the change of area type location request was successfully accepted by the target UE. The R-GMLC may record charging information for the accepted change of area type location request.

Step 512~Step 513: If the location area event occurs, i.e., the target UE enters into, leaves or is inside the specified target area, the target UE sends a Location Area Event Report carrying the location area event and the Reference Number to the CN via the RAN to notify the CN that a location area event trigger happens. The corresponding relationship between the submitted location area event and the change of area type location request may be identified by the Reference Number.

Step 514: Upon receiving the Location Area Event Report, the CN sends a Subscriber Location Report carrying the Reference Number and the H-GMLC address information to the V-GMLC to notify the V-GMLC of the occurrence of the location area event of the target UE. The corresponding relationship between the submitted location area event and the change of area type location request may be identified by the Reference Number.

Step 515: Upon receiving the Subscriber Location Report, the V-GMLC sends a Subscriber Location Report ACK to the CN to notify that the Subscriber Location Report was successfully received. At this time, the CN may generate a corresponding Calling Detailed Record (CDR) for the change of area type location request.

Step 516: Upon receiving the Subscriber Location Report, the V-GMLC sends an LCS Service Response carrying the Reference Number to the H-GMLC according to the H-GMLC address information to notify the H-GMLC of the occurrence of the location area event of the target UE. The corresponding relationship between the submitted location area event and the change of area type location request may be identified by the Reference Number.

Step 517: Upon receiving the LCS Service Response, the H-GMLC may authorize the LCS Client to ensure that the location area event of the target UE provided for the LCS Client is within the authorization of the LCS Client. If the LCS Client passes the authorization, proceed to step 518. Otherwise, the H-GMLC returns a check failure message to the R-GMLC, and the R-GMLC rejects the change of area type location request initiated by the LCS Client. Then the procedure is over.

Step 518~Step 519: The H-GMLC sends an LCS Service Response carrying the Reference Number to the R-GMLC to notify the R-GMLC of the occurrence of the location area event of the target UE. The corresponding relationship between the submitted location area event and the change of area type location request may be identified by the Reference Number. Upon receiving the LCS Service Response, the R-GMLC sends the LCS Service Response carrying the Reference Number to the LCS Client, to notify the occurrence of the location area event of the target UE.

There is no sequential requirement on the executing time of Step 515 and Step 516~Step 519.

Also, there is no sequential requirement on the executing time of Step 507~Step 511 and step 512~step 519.

In addition, the LCS Client may not only request the target UE to send a location area event report via the LCS system when the location area event of the target UE happens, but also request the LCS system to provide the location information of the target UE when sending the location area event report. Therefore, upon receiving the location area event report from the target UE, the LCS system judges whether the LCS Client requests to be provided with the location information of the target UE. If the LCS Client requests to be provided with the location information of the target UE, the LCS system locates the target UE, and then returns a location area event report and the location information of the target UE to the LCS Client, e.g., after the R-GMLC receives the location area event report, i.e., after step 518, the LCS system determines that the LCS Client requests to be provided with the location information of the target UE, the LCS system sends an LCS Service Request to the H-GMLC, the process is basically the same as Step 203~Step 208 and Step 210~Step 216, which will not be repeated. Otherwise, the LCS system only returns the location area event report to the LCS Client.

If the target UE moves to a new CN during the above process, the H-GMLC sends a specified event to the new CN via the V-GMLC, and the process may be started with Step 303.

It may be seen from the above descriptions of the Deferred Location Request processes, the Reference Number, which is assigned for the Deferred Location Request by the R-GMLC, works in the entire handling process of the Deferred Location Request. One Reference Number is used for one Deferred Location Request. As to the Deferred Location Requests to different target UEs, the Reference Numbers may be the same, i.e., in the same R-GMLC, different Deferred Location Request processes may be differentiated by a combination of the target UE identifier and the Reference Number. But for the same target UE, it may not ensure that the Reference Numbers assigned for different Deferred Location Requests by different R-GMLCs are different from each other when an LCS Client initiates a Deferred Location Request to the same target UE via different R-GMLCs. As for the H-GMLC, the same problem may also exist that different Deferred Location Requests may not be differentiated only by the Reference Number and the target UE identifier. In addition, the target UE is facing the same problem when processing the change of area type location request.

SUMMARY OF THE INVENTION

Embodiments of the present invention provide a method for handling a Deferred Location Request, so as to ensure that the Deferred Location Request may be processed normally.

According to an embodiment of the present invention, the method for handling a Deferred Location Request includes:

initiating, by a Location Service (LCS) Client, a Deferred Location Request for a target User Equipment (UE) to a Requesting-Gateway Mobile Location Center (R-GMLC;

forwarding, by the R-GMLC, the Deferred Location Request to a Home-GMLC (H-GMLC);

assigning, by the H-GMLC, a Reference Number for the Deferred Location Request, and sending the Deferred Location Request to a Core Network (CN) via a Visited-GMLC (V-GMLC);

when a deferred event occurs, submitting, by the CN, a target UE location report and the Reference Number to the H-GMLC via the V-GMLC;

returning, by the H-GMLC, the target UE location report to the LCS Client via the R-GMLC.

In accordance with the method provided by embodiments of the present invention, during the processing of the Deferred Location Request, the H-GMLC assigns a Reference Number for the Deferred Location Request. Since the H-GMLC is the home GMLC of the target UE, the Reference Number assigned by the H-GMLC may ensure that each Deferred Location Request initiated for the same Target UE may be exclusively differentiated, such that different Deferred Location Requests initiated by the LCS Client via different R-GMLCs may be processed normally, the collision in the processing of the LCS may be effectively resolved and the operational requirements may be better satisfied.

DETAILED DESCRIPTIONS OF THE INVENTION

The present invention is hereinafter described in detail with reference to accompanying drawings and embodiments.

In embodiments of the present invention, the H-GMLC assigns a Reference Number for a Deferred Location Request during the processing of the Deferred Location Request. Since the H-GMLC is the home GMLC of the target UE, different Deferred Location Requests for the same target UE may be uniquely differentiated by the Reference Numbers assigned by the H-GMLC.

Figure 1:
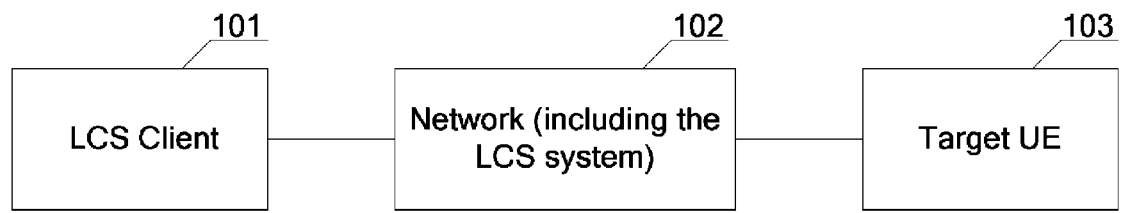
FIG. 1 is a schematic diagram illustrating a conventional logical structure to implement an LCS.
Figure 2:
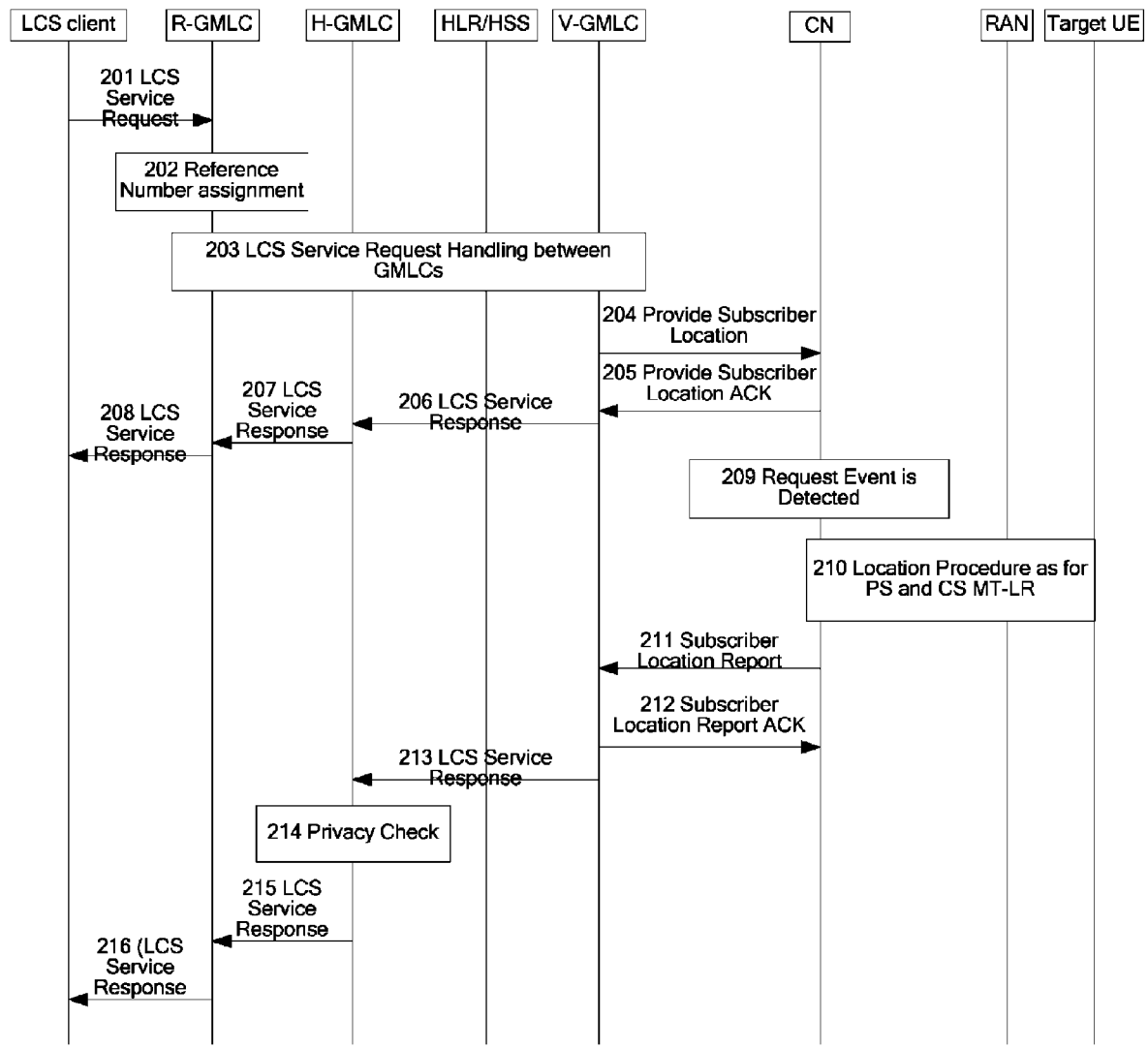
FIG. 2 is a flowchart illustrating a conventional handling process of a target UE Available Deferred Location Request.
Figure 3:
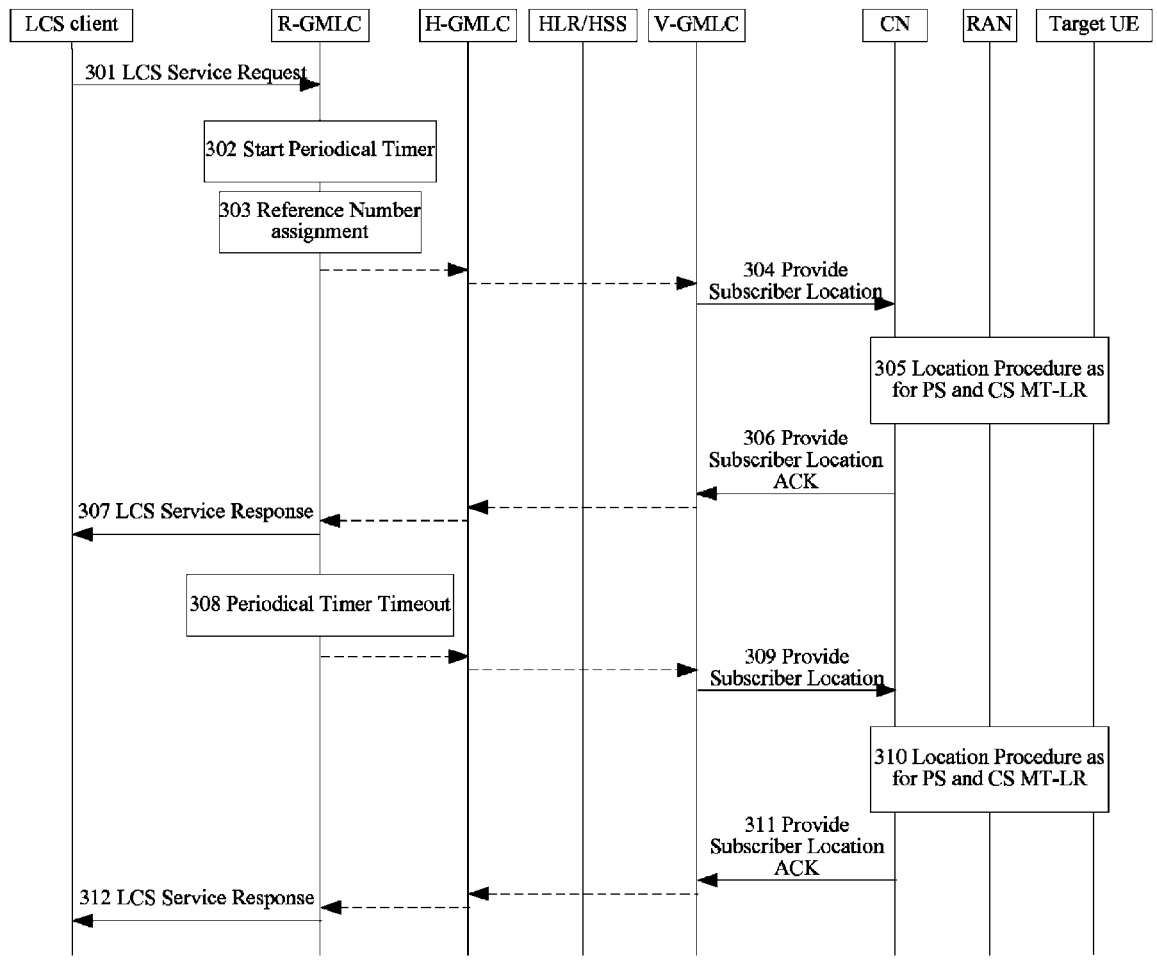
FIG. 3 is a flowchart illustrating a conventional handling process of a Periodical Location Request.
Figure 4:
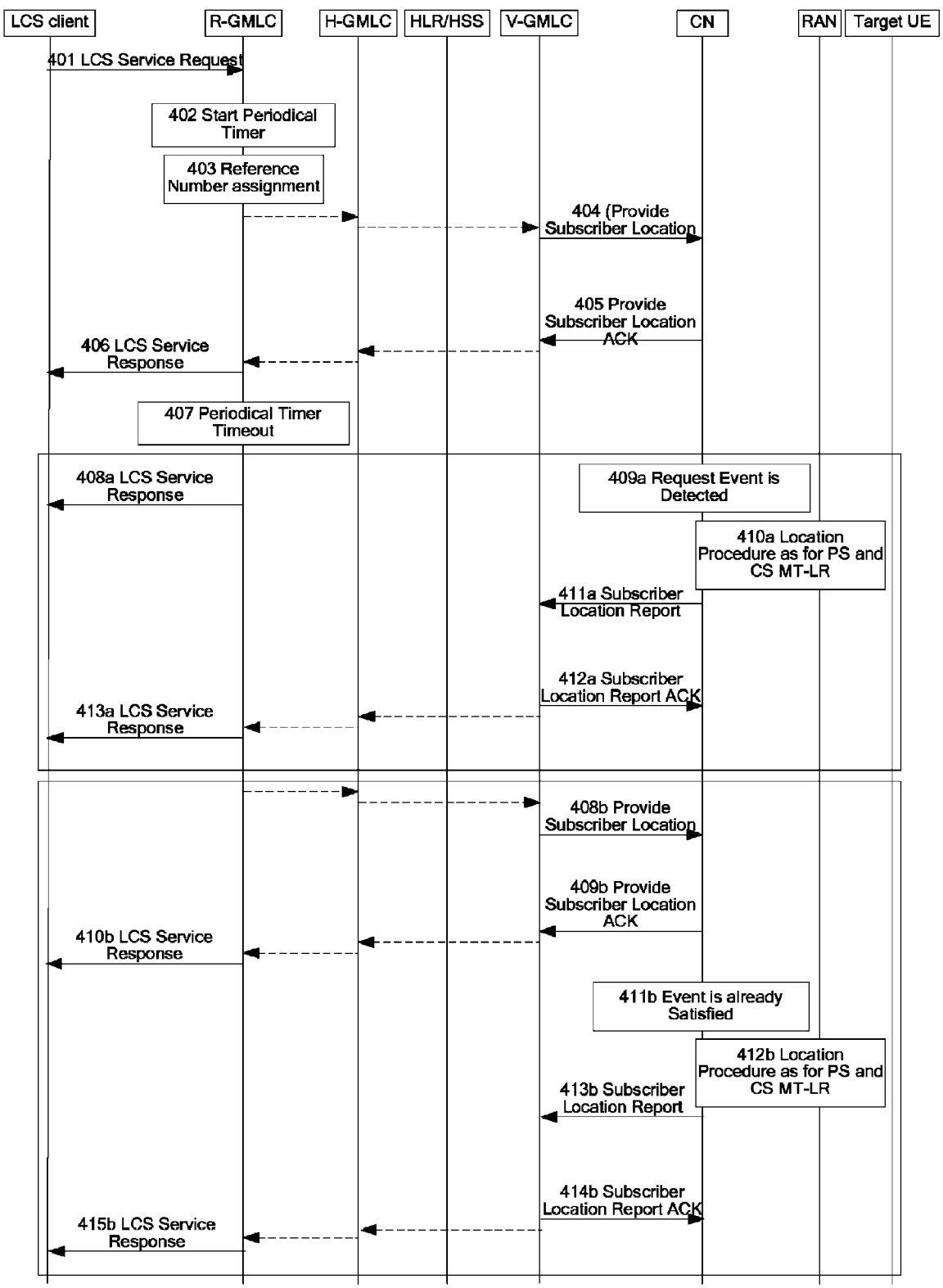
FIG. 4 is a flowchart illustrating a conventional handling process of a Combined Periodical and target UE Available Deferred Location Request.
Figure 5:
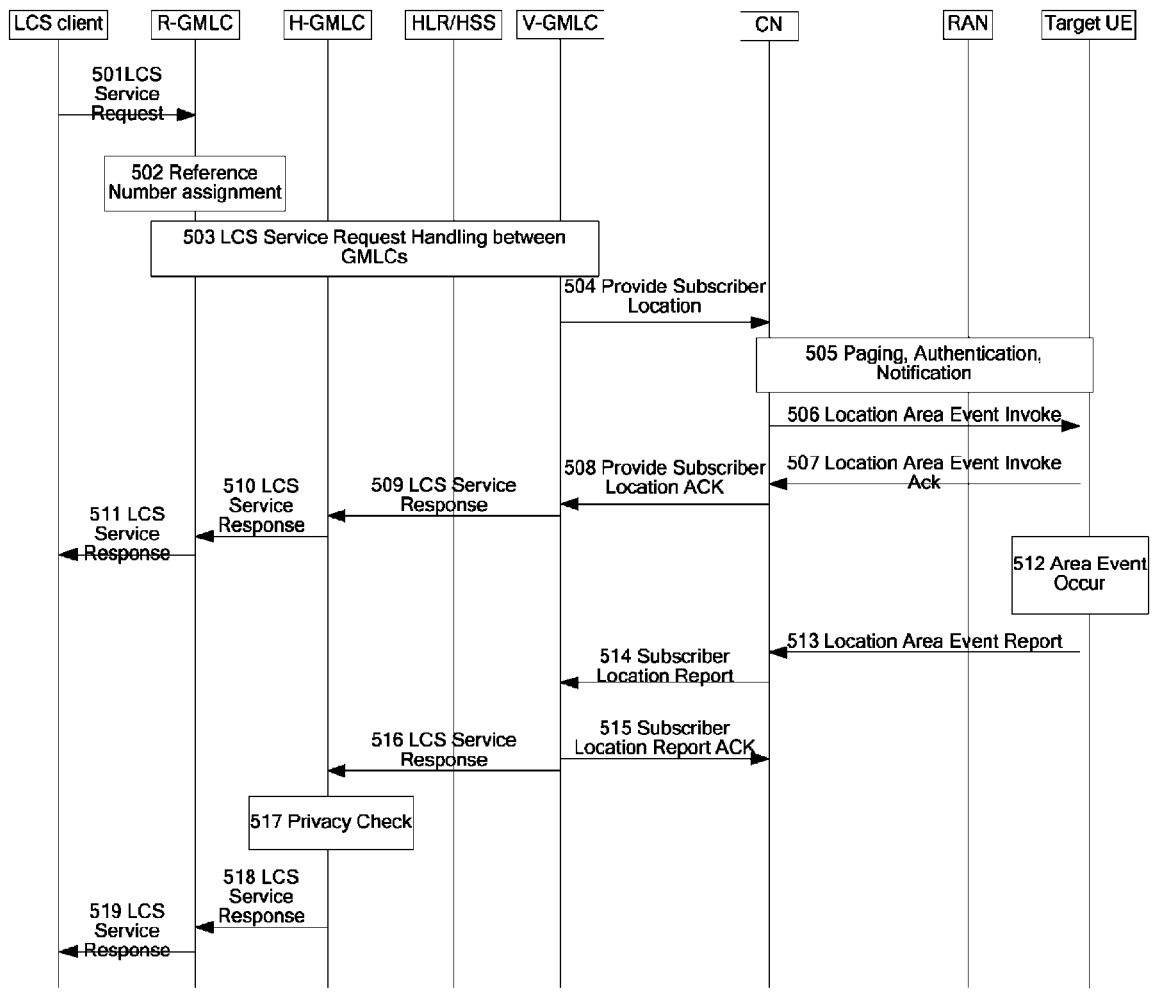
FIG. 5 is a flowchart illustrating a conventional handling process of a change of area type location request.
Figure 6:
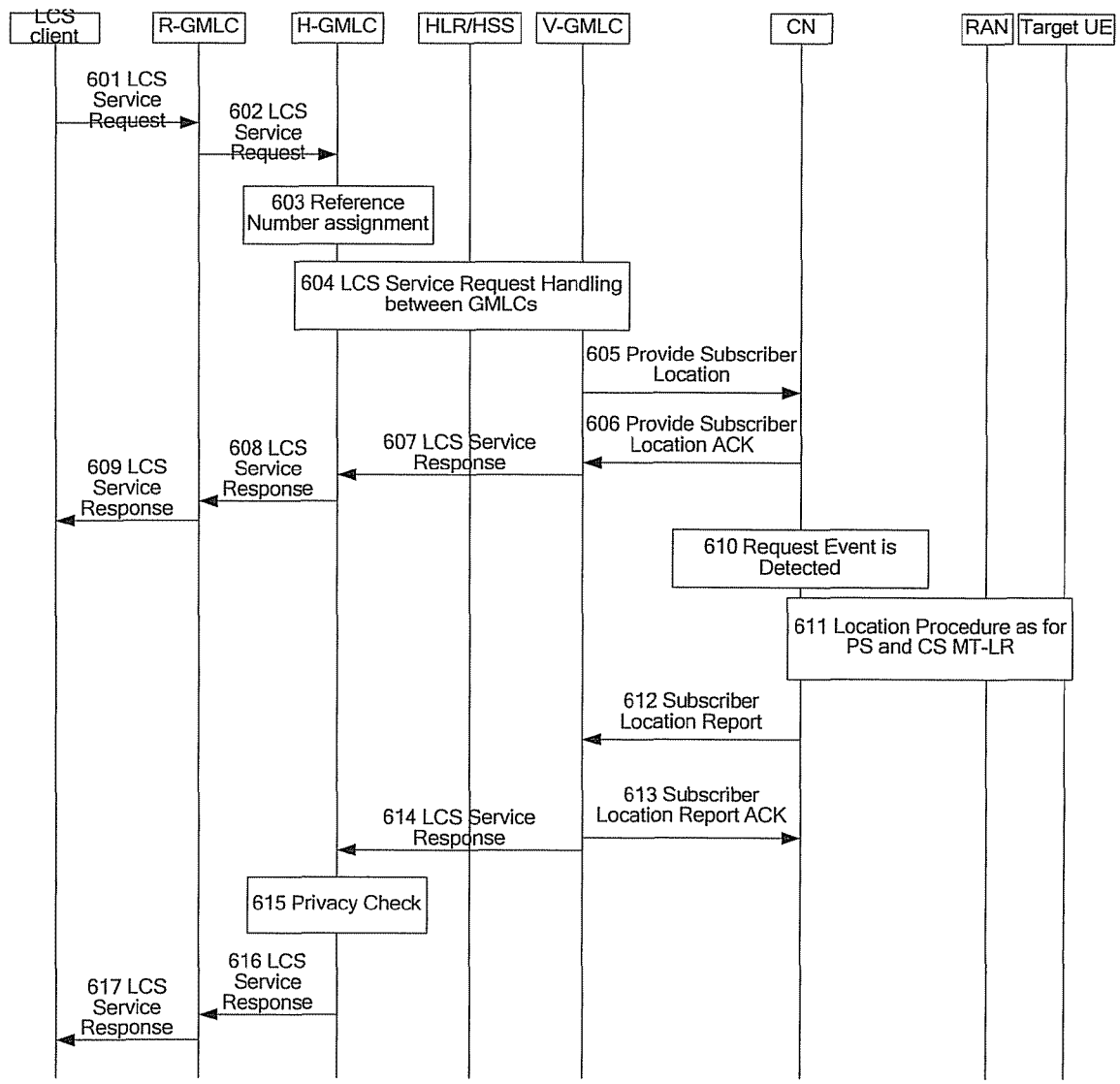
FIG. 6 is a flow chart illustrating a handling process of a target UE Available Deferred Location Request in accordance with an embodiment of the present invention.

FIG. 6 is a flowchart illustrating a handling process of a Target UE Available Deferred Location Request in accordance with an embodiment of the present invention. As shown in FIG. 6, the process includes the following steps.

Step 601: an LCS Client sends an LCS Service Request, carrying a target UE identifier, a terminal available indication and a specified event to the R-GMLC. The LCS Service Request further carries QoS information to indicate the QoS information that the obtained location information of the target UE must satisfy.

Step 602~Step 604: Upon receiving the LCS Service Request, the R-GMLC forwards the LCS Service Request carrying the target UE identifier and the specified event to the H-GMLC. Upon receiving the LCS Service Request, the H-GMLC assigns a Reference Number for the Deferred Location Request, and then sends the LCS Service Request carrying the target UE identifier, the specified event, the Reference Number and the H-GMLC address information to the V-GMLC.

Step 605: Upon receiving the LCS Service Request, the V-GMLC sends a Provide Subscriber Location request message, carrying the target UE identifier, the specified event, the Reference Number and the H-GMLC address information, to the CN. Upon receiving the Provide Subscriber Location request message, if the CN supports the Deferred Location Request and a security/privacy check succeeds, proceed to step 606; if the CN does not support the Deferred Location Request or the security/privacy check fails, the CN returns a Provide Subscriber Location Return Error with a suitable cause and the Reference Number to the V-GMLC. Then the V-GMLC returns a failure message to the H-GMLC, and the H-GMLC returns the failure message carrying the Reference Number to the R-GMLC, and then the R-GMLC rejects the location request initiated by the LCS Client, then the procedure is over.

Step 606~Step 609: The CN returns a Provide Subscriber Location ACK carrying the Reference Number to the V-GMLC to notify the V-GMLC that the Deferred Location Request was successfully accepted. The CN may record charging information for the accepted Deferred Location Request. Upon receiving the Provide Subscriber Location ACK, the V-GMLC sends an LCS Service Response carrying the Reference Number assigned for the Deferred Location Request by the H-GMLC to the H-GMLC according to the H-GMLC address information, to notify the H-GMLC that the Deferred Location Request was successfully accepted. The V-GMLC may record charging information for the accepted Deferred Location Request. Upon receiving the LCS Service Response, the H-GMLC sends the LCS Service Response carrying the Reference Number to the R-GMLC to notify the R-GMLC that the Deferred Location Request was successfully accepted. The H-GMLC may record charging information for the accepted Deferred Location Request. Upon receiving the LCS Service Response, the R-GMLC sends the LCS Service Response carrying the Reference Number to the LCS Client to notify the LCS Client that the Deferred Location Request was successfully accepted. The R-GMLC may record charging information for the accepted Deferred Location Request.

Step 610: The CN detects whether the specified event has happened, if the specified event has happened, proceed to step 611. Otherwise, return to step 610.

Step 611: The CN cooperates with the RAN to implement the Location Procedure for the target UE.

Step 612: Upon obtaining a location estimate of the target UE, the CN sends a Subscriber Location Report carrying the Reference Number, the H-GMLC address information and the location estimate of the target UE to the V-GMLC. The corresponding relationship between the returned location estimate of the target UE and the Deferred Location Request is identified by the Reference Number.

Step 613~Step 614: Upon receiving the Subscriber Location Report, the V-GMLC sends a Subscriber Location Report ACK to the CN to notify that the Subscriber Location Report was successfully received, and sends an LCS Service Response carrying the Reference Number and the location estimate of the target UE to the H-GMLC according to the H-GMLC address information. The corresponding relationship between the returned location estimate of the target UE and the Deferred Location Request is identified by the Reference Number.

Step 615: Upon receiving the LCS Service Response, the H-GMLC may authorize the LCS Client to ensure that the location estimate of the target UE provided for the LCS Client is within the authorization of the LCS Client. If the LCS Client passes the authorization, proceed to step 616. Otherwise, the H-GMLC returns a check failure message to the R-GMLC, and the R-GMLC rejects the change of area type location request initiated by the LCS Client, then the procedure is over.

Step 616~Step 617: The H-GMLC sends the LCS Service Response carrying the Reference Number and the location estimate of the target UE to the R-GMLC. The corresponding relationship between the returned location estimate of the target UE and the Deferred Location Request is identified by the Reference Number. Upon receiving the LCS Service Response, the R-GMLC sends the LCS Service Response carrying the Reference Number and location estimate of the target UE to the LCS Client.

There is no sequential requirement on the executing time of Step 613 and Step 614~Step 617.

Also, there is no sequential requirement on the executing time of Step 606~Step 609 and step 610~step 617.

If the target UE moves to a new CN during the above process, the H-GMLC sends a specified event to the new CN via the V-GMLC, and the process may be started with Step 604.

Figure 7:
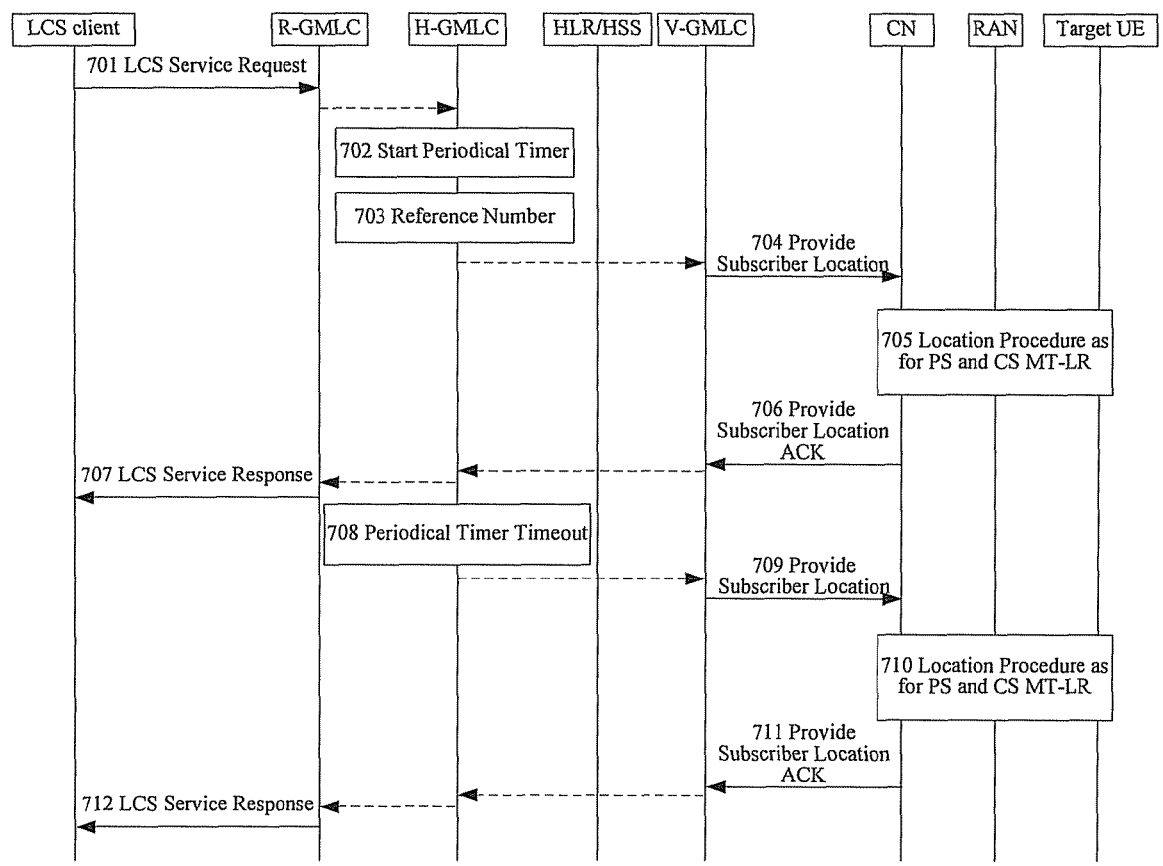
FIG. 7 is a flowchart illustrating a handling process of a Periodical Location Request in accordance with an embodiment of the present invention.

FIG. 7 is a flowchart illustrating a handling process of a Periodical Location Request. As shown in FIG. 7, the process includes the following steps.

Step 701: an LCS Client sends an LCS Service Request to the R-GMLC to request the LCS system to locate the target UE periodically. The LCS Service Request carries a target UE identifier, a start time, a stop time, a time interval to locate the target UE and other related information. Upon receiving the LCS Service Request, the R-GMLC forwards the LCS Service Request to the H-GMLC.

Step 702: Upon receiving the LCS Service Request, the H-GMLC starts a Periodical Timer according to related information to begin to locate the target UE periodically.

Step 703: The H-GMLC assigns a Reference Number for the Periodical Location Request, and then sends the LCS Service Request carrying the target UE identifier, the Reference Number and the H-GMLC address information to the V-GMLC.

Step 704~Step 705: Upon receiving the LCS Service Request, the V-GMLC sends a Provider Subscriber Location request message to the CN. Upon receiving the Provide Subscriber Location request message, the CN cooperates with the RAN to implement the Location Procedure for the target UE.

Step 706~Step 707: Upon obtaining a location estimate of the target UE, the CN sends a Provide Subscriber Location ACK carrying the location estimate of the target UE to the V-GMLC. Upon receiving the Provide Subscriber Location ACK, the V-GMLC sends an LCS Service Response carrying the Reference Number and the location estimate of the target UE to the H-GMLC according to the H-GMLC address information. The corresponding relationship between the returned location estimate of the target UE and the Periodical Location Request is identified by the Reference Number. Upon receiving the LCS Service Response, the H-GMLC sends the LCS Service Response carrying the Reference Number and the location estimate of the target UE to the R-GMLC. The corresponding relationship between the returned location estimate of the target UE and the Periodical Location Request is identified by the Reference Number. Upon receiving the LCS Service Response, the R-GMLC sends the LCS Service Response carrying the Reference Number and the location estimate of the target UE to the LCS Client.

Step 708~Step 712: If the Periodical Timer expires, i.e., reaching a time period of the Periodical Location Request, the subsequent process includes: upon receiving the LCS Service Request, the H-GMLC sends an LCS Service Request carrying the target UE identifier, the Reference Number and the H-GMLC address information, to the V-GMLC. The following process is the same as Step 704~Step 707.

The process of each subsequent time period is basically the same as the above steps.

Figure 8:
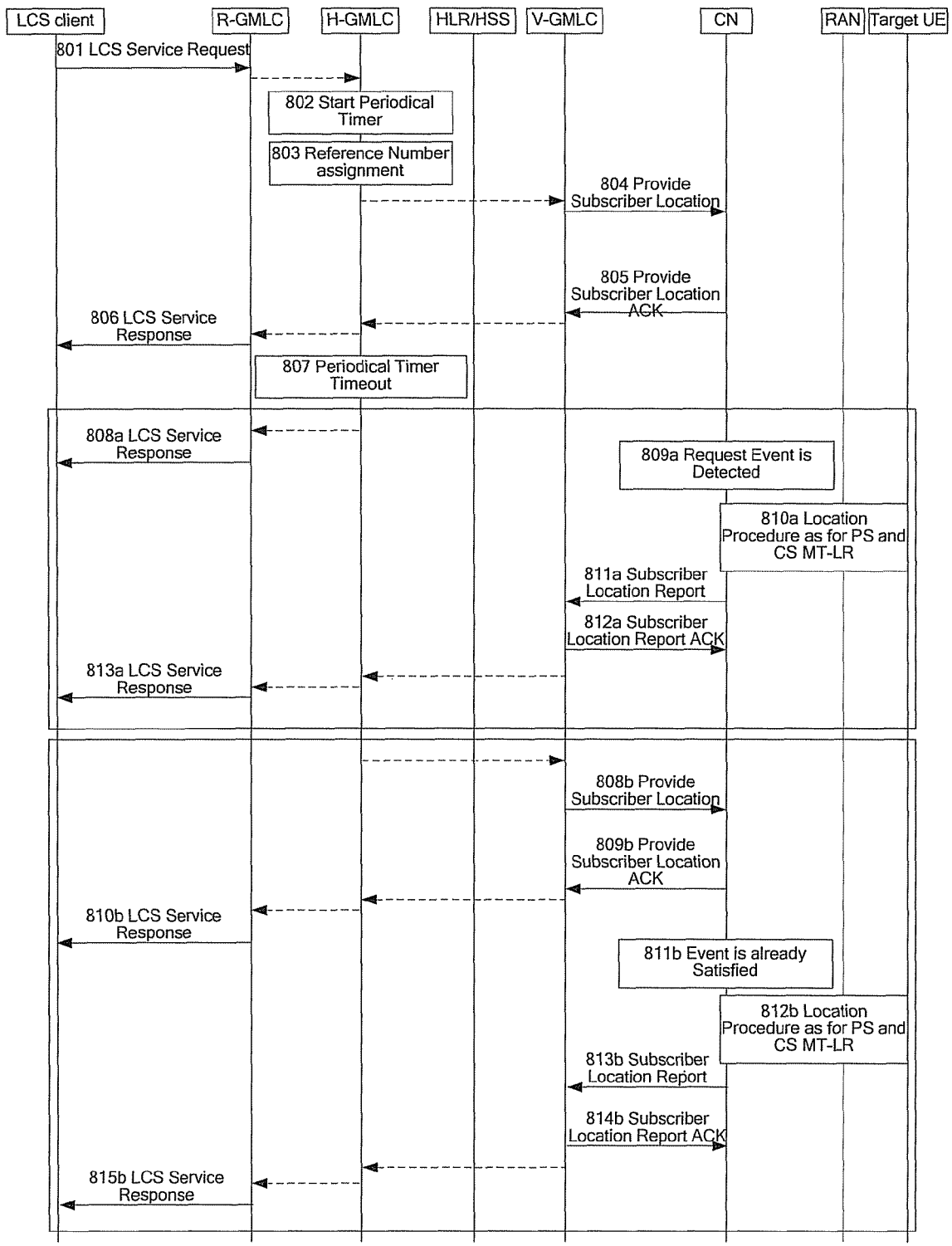
FIG. 8 is a flowchart illustrating a handling process of a Combined Periodical and target UE Available Deferred Location Request in accordance with an embodiment of the present invention.

FIG. 8 is a flowchart illustrating a handling process of a Combined Periodical and target UE Available Deferred Location Request. As shown in FIG. 8, the process includes:

Step 801: an LCS Client sends an LCS Service Request to the R-GMLC to request the LCS system to provide location information of a target UE. The LCS Service Request carries a target UE identifier and a specified event to locate the target UE, e.g., locating the target UE as soon as it attaches to the mobile network. The LCS Service Request also carries periodicity logic, i.e., a period start time, a period stop time and a time interval to locate the target UE. Upon receiving the LCS Service Request, the R-GMLC forwards the LCS Service Request to the H-GMLC.

Step 802: Upon receiving the LCS Service Request, the H-GMLC starts a Periodical Timer according to related information to begin to locate the target UE periodically.

Step 803: The H-GMLC assigns a Reference Number for the Combined Periodical and target UE Available Location Request, and then sends the LCS Service Request carrying the target UE identifier, the Reference Number, the specified event and the H-GMLC address information to the V-GMLC.

Step 804~Step 806: Upon receiving the LCS Service Request, the V-GMLC sends a Provide Subscriber Location carrying the target UE identifier, the specified event, the Reference Number and the H-GMLC address information to the CN. Upon receiving the Provide Subscriber Location, the CN returns a Provide Subscriber Location ACK carrying the Reference Number to the V-GMLC to notify that the Combined Periodical and target UE Available Location Request was successfully accepted. The CN may record charging information for the accepted Combined Periodical and target UE Available Location Request. Upon receiving the Provide Subscriber Location ACK, the V-GMLC sends an LCS Service Response carrying the Reference Number to the H-GMLC according to the H-GMLC address information to notify that the Combined Periodical and target UE Available Location Request was successfully accepted. The V-GMLC may record charging information for the accepted Combined Periodical and target UE Available Location Request. Upon receiving the LCS Service Response, the H-GMLC sends the LCS Service Response carrying the Reference Number to the R-GMLC to notify that the Combined Periodical and target UE Available Location Request was successfully accepted. The H-GMLC may record charging information for the accepted Combined Periodical and target UE Available Location Request. Upon receiving the LCS Service Response, the R-GMLC sends the LCS Service Response carrying the Reference Number to the LCS Client to notify that the Combined Periodical and target UE Available Location Request was successfully accepted. The R-GMLC may record charging information for the accepted Combined Periodical and target UE Available Location Request.

Step 807: When the Periodical Timer expires, if the H-GMLC is in a state of waiting for the CN to return the location estimate of the target UE, proceed to step 808a; otherwise, proceed to step 808b.

Step 808a: The H-GMLC sends an LCS Service Response carrying the Reference Number to the R-GMLC to notify the R-GMLC that no target UE location estimate may be provided for the moment. Upon receiving the LCS Service Response, the R-GMLC sends an LCS Service Response carrying the Reference Number to the LCS Client to notify the LCS Client that no target UE location estimate may be provided for the moment.

Step 809a: The CN detects whether the specified event has happened. If the specified event has happened, proceed to step 810a. Otherwise, return to step 809a.

Step 810a: The CN cooperates with the RAN to implement the location operations of the target UE.

Step 811a: Upon obtaining the location estimate of the target UE, the CN sends a Subscriber Location Report carrying the Reference Number, the H-GMLC address information and target UE location estimate to the V-GMLC. The corresponding relationship between the returned target UE location estimate and the Combined Periodical and target UE Available Location Request is identified by the Reference Number.

Step 812a: Upon receiving the Subscriber Location Report, the V-GMLC sends a Subscriber Location Report ACK to the CN to notify that the Subscriber Location Report was successfully received.

Step 813a: Upon receiving the Subscriber Location Report, the V-GMLC sends an LCS Service Response carrying the Reference Number and the location estimate of the target UE to the H-GMLC according to the H-GMLC address information. The corresponding relationship between the returned location estimate of the target UE and the Combined Periodical and target UE Available Location Request is identified by the Reference Number. Upon receiving the LCS Service Response, the H-GMLC sends the LCS Service Response carrying the Reference Number and the location estimate of the target UE to the R-GMLC. The corresponding relationship between the returned location estimate of the target UE and the Combined Periodical and target UE Available Location Request is identified by the Reference Number. Upon receiving the LCS Service Response, the R-GMLC sends the LCS Service Response carrying the Reference Number and the location estimate of the target UE to the LCS Client . . . .

Step 808b~Step 810b: The H-GMLC sends an LCS Service Request carrying the target UE identifier, the Reference Number and the H-GMLC address information, to the V-GMLC. The following process is the same as Step 804~Step 806.

Step 811b: the specified event is satisfied.

Steps 812b~Step 815b are the same as Step 810a~Step 813a.

The process of each subsequent time period is basically the same as the above process.

Figure 9:
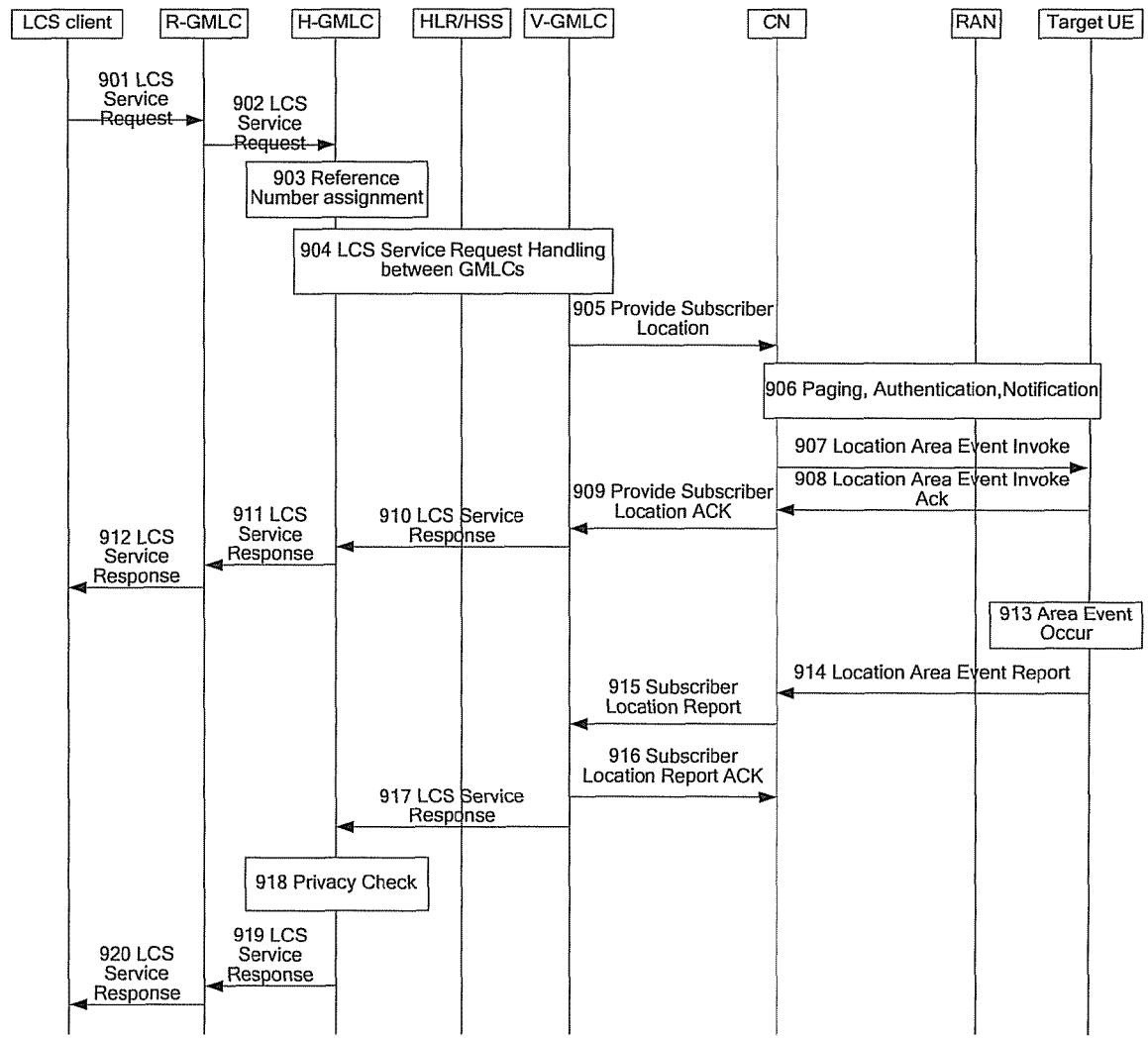
FIG. 9 is a flowchart illustrating a processing of a change of area type location request in accordance with an embodiment of the present invention.

FIG. 9 is a flowchart illustrating a handling process of a change of area type location request. As shown in FIG. 9, the process includes:

Step 901: an LCS Client sends an LCS Service Request to the R-GMLC. The LCS Service Request carries a target UE identifier and a location area event, e.g., a specified target area and a location event report trigger, the location area event may be reported when the target UE enters into, leaves or is inside a specified target area.

Step 902~Step 904: Upon receiving the LCS Service Request, the R-GMLC forwards the LCS Service Request carrying the target UE identifier, the location area event and the Reference Number to the H-GMLC. Upon receiving the LCS Service Request, the H-GMLC assigns a Reference Number for the change of area type location request, then forwards the LCS Service Request carrying the target UE identifier, the location area event, the Reference Number and the H-GMLC address information to the V-GMLC.

Step 905: Upon receiving the LCS Service Request, the V-GMLC sends a Provide Subscriber Location request message carrying the target UE identifier, the location area event, the Reference Number and the H-GMLC address information to the CN.

Step 906: Upon receiving the Provide Subscriber Location, the CN determines whether both the CN and the target UE support the change of area type location request, and implements a security/privacy check. If both the CN and the target UE support the change of area type location request and the security/privacy check succeeds, the CN further detects whether the target UE is in an idle mode. If the target UE is in the idle mode, the CN implements paging, authentication and ciphering, then proceed to step 306; If the CN or the target UE does not support the change of area type location request or the security/privacy check fails, the CN returns a Provide Subscriber Location Return Error with a suitable cause and the Reference Number to the V-GMLC. Then the V-GMLC returns a failure message carrying the Reference Number to the H-GMLC, the H-GMLC returns a failure message carrying the Reference Number to the R-GMLC, and the R-GMLC rejects the location request initiated by the LCS Client, then the procedure is over.

Step 907~Step 908: The CN sends a Location Area Event Invoke carrying the location area event and the Reference Number to the target UE via the RAN. Upon receiving the Location Area Event Invoke, if the target UE supports the change of area type location request, the target UE stores the location area event as well as the Reference Number, then starts to monitor the occurrence of the location area event. The target UE sends a Location Area Event Invoke ACK to the CN to notify that the change of area type location request was successfully accepted and processed, then proceed to step 509. If the target UE does not support the change of area type location request, it returns a Location Area Event Invoke ACK with a suitable cause to the CN. The CN returns a Provide Subscriber Location Return Error with a suitable cause to the V-GMLC. The V-GMLC returns a failure message carrying the Reference Number to the H-GMLC, the H-GMLC returns a failure message carrying the Reference Number to the R-GMLC, and the R-GMLC rejects the location request initiated by the LCS Client, then the procedure is over.

Step 909~Step 912: Upon receiving the Location Area Event Invoke ACK, the CN sends a Provide Subscriber Location ACK carrying the Reference Number to the V-GMLC to notify that the change of area type location request was successfully accepted. The CN may record charging information for the accepted change of area type location request. Upon receiving the Provide Subscriber Location ACK, the V-GMLC sends an LCS Service Response carrying the Reference Number to the H-GMLC to notify the H-GMLC that the change of area type location request was successfully accepted by the target UE. The V-GMLC may record charging information for the accepted change of area type location request. Upon receiving the LCS Service Response, the H-GMLC sends the LCS Service Response carrying the Reference Number to the R-GMLC to notify the R-GMLC that the change of area type location request was successfully accepted by the target UE. Then the H-GMLC may record charging information of the accepted change of area type location request. Upon receiving the LCS Service Response, the R-GMLC sends the LCS Service Response carrying the Reference Number to the LCS Client to notify the LCS Client that the change of area type location request was successfully accepted by the target LE. The R-GMLC may record charging information for the accepted change of area type location request.

Step 913~Step 914: If the location area event has happened, i.e., the target UE enters into, leaves or is inside the specified target area, the target UE sends a Location Area Event Report carrying a location area event and the Reference Number to the CN via the RAN to notify the CN that a location area event trigger has happened. The corresponding relationship between the submitted location area event and the change of area type location request may be identified by the Reference Number.

Step 915: Upon receiving the Location Area Event Report, the CN sends a Subscriber Location Report carrying the Reference Number and the H-GMLC address information to the V-GMLC to notify the occurrence of the location area event of the target UE. The corresponding relationship between the submitted location area event and the change of area type location request may be identified by the Reference Number.

Step 916: Upon receiving the Subscriber Location Report, the V-GMLC sends a Subscriber Location Report ACK to the CN to notify the CN that the V-GMLC has already received the Subscriber Location Report. At this time, the CN may generate a corresponding Call Detailed Record (CDR) for the change of area type location request.

Step 917: Upon receiving the Subscriber Location Report, the V-GMLC sends an LCS Service Response carrying the Reference Number to the H-GMLC according to the H-GMLC address information to notify the occurrence of the location area event of the target UE. The corresponding relationship between the submitted location area event and the change of area type location request may be identified by the Reference Number.

Step 918: Upon receiving the LCS Service Response, the H-GMLC may authorize the LCS Client to ensure that the location area event of the target UE provided for the LCS Client is within the authorization of the corresponding LCS Client. If the LCS Client passes the authorization, proceed to step 919. Otherwise, the H-GMLC returns a check failure message carrying the Reference Number to the R-GMLC. Then the R-GMLC rejects the change of area type location request initiated by the LCS Client, then procedure is over.

Step 919~Step 920: The H-GMLC sends an LCS Service Response carrying the Reference Number to the R-GMLC to notify the occurrence of the location area event of the target UE. The corresponding relationship between the submitted location area event and the change of area type location request may be identified by the Reference Number.

Upon receiving the LCS Service Response, the R-GMLC sends the LCS Service Response carrying the Reference Number to the LCS Client to notify the occurrence of the location area event of the target UE.

There is no sequential requirement on the executing time of Step 916 and Step 917~Step 920.

Also, there is no sequential requirement on the executing time of Step 908~Step 912 and step 913~step 920.

In addition, the LCS Client may also request the LCS system to provide the location information of the target UE when sending an LCS Service Response. Therefore, after receiving the location area event report from the target UE, the LCS system will judge whether the LCS Client requests to be provided with the location information of the target UE. If the LCS Client requests the location information of the target UE, the LCS system locates the target UE, then returns the location area event report and the location information of the target UE to the LCS Client, i.e., after receiving the location area event report, i.e., after the step 519, the R-GMLC determines that the LCS Client requests the location information of the target UE, and sends an LCS Service Request to the H-GMLC. The process is basically the same as Step 203~Step 208 and Step 210~Step 216, which will not be repeated. Or, after receiving the location area event report, i.e., after step 518, the H-GMLC determines that the LCS Client requests the location information of the target UE, then sends an LCS Service Request to the V-GMLC. The process is basically the same as Step 203~Step 208 and Step 210~Step 216, which is not repeated herein, either. Otherwise, the LCS system only returns the location area event report to the LCS Client.

If the target UE moves to a new CN during the above process, the H-GMLC will send a specified event to the new CN via the V-GMLC, and the process may start with Step 303.

In addition, it may depend on the R-GMLC to assign the Reference Number for the Deferred Location Request, and may be to extend the Reference Number, i.e., defining the Reference Number to be one of the following forms, such as a combination of R-GMLC address information and a sequence number, a combination of LCS Client information and a sequence number, a combination of request information and a serial number. Wherein, the request information may be a session identifier, a request identifier, etc. The serial number mentioned above may be a random number, a sequence number, etc.

To sum up, the above-mentioned embodiments are the preferred embodiments of the present invention, which are not used for confine the protection scope of the present invention.

What is claimed is:

1. A method for handling a Deferred Location Request, comprising:
   initiating, by a Location Service (LCS) Client, a Deferred Location Request for a target User Equipment (UE) to a Requesting-Gateway Mobile Location Center (R-GMLC);
   forwarding, by the R-GMLC, the Deferred Location Request to a Home-GMLC (H-GMLC);
   assigning, by the H-GMLC, a Reference Number for the Deferred Location Request, and sending the Deferred Location Request to a Core Network (CN) via a Visited-GMLC (V-GMLC);
   submitting, by the CN, a target UE location report and the Reference Number to the H-GMLC via the V-GMLC when a deferred event occurs;
   returning, by the H-GMLC, the target UE location report to the LCS Client via the R-GMLC.

2. The method of claim 1, wherein the assigning a Reference Number for the Deferred Location Request and sending the Deferred Location Request to a CN via a V-GMLC by the H-GMLC further comprises:
   providing, by the H-GMLC, the Reference Number for the R-GMLC.

3. The method of claim 2, further comprising:
   after providing the Reference Number for the R-GMLC by the H-GMLC, providing, by the R-GMLC, the Reference Number for the LCS Client.

4. The method of claim 3, wherein the submitting a target UE location report to the R-GMLC by the H-GMLC further comprises:
   providing, by the H-GMLC, the Reference Number for the R-GMLC.

5. The method of claim 4, wherein the returning the target UE location report to the LCS Client further comprises:
   providing, by the R-GMLC, the Reference Number for the LCS Client.

6. The method of claim 3, the Deferred Location Request sent by the LCS Client to the R-GMLC is a target UE Available Location Request;
   the submitting a target UE location report and the Reference Number to the H-GMLC and returning the target UE location report to the LCS Client comprises:
   when detecting that a specified event happens, cooperating, by the CN, with a Radio Access Network (RAN) to locate the target UE to obtain a location estimate of the target UE, and submitting the location estimate of the target UE and the Reference Number to the H-GMLC via the V-GMLC;
   returning, by the H-GMLC, the location estimate of the target UE to the LCS Client via the R-GMLC.

7. The method of claim 3, wherein the Deferred Location Request sent by the LCS Client to the R-GMLC is a Periodical Location Request;
   the submitting a target UE location report and the Reference Number to the H-GMLC and returning the target UE location report to the LCS Client comprises:
   when a time period of a Periodical Location Request ends or a next time period thereof starts, notifying, by the H-GMLC, the CN via the V-GMLC to locate the target UE;
   cooperating, by the CN, with the RAN to locate the target UE to obtain a location estimate of the target UE;
   submitting, by the CN, the location estimate of the target UE and the Reference Number to the H-GMLC via the V-GMLC;
   returning, by the H-GMLC, the location estimate of the target UE to the LCS Client via the R-GMLC.

8. The method of claim 3, wherein the Deferred Location Request sent by the LCS Client to the R-GMLC is a Periodical Deferred Location Request;
   when a time period of the Periodical Deferred Location Request ends or a next time period thereof starts, and the H-GMLC is in a state of waiting for the CN to return a location estimate of the target UE, before submitting a Subscriber Location Report and the Reference Number to the H-GMLC via the V-GMLC by the CN, the method further comprises:
   notifying, by the H-GMLC via the R-GMLC, the LCS Client that no location estimate of the target UE may be provided for the moment;
   the submitting a target UE location report and the Reference Number to the H-GMLC and returning the target UE location report to the LCS Client comprises:
   when detecting that a specified event happens, cooperating, by the CN, with the RAN to locate the target UE to obtain a location estimate of the target UE, submitting the location estimate of the target UE and the Reference Number to the H-GMLC via the V-GMLC;
   returning, by the H-GMLC, the location estimate of the target UE to the LCS Client via the R-GMLC.

9. The method of claim 3, wherein the Deferred Location Request sent by the LCS Client to the R-GMLC is a Periodical Deferred Location Request;
   the submitting a target UE location report and the Reference Number to the H-GMLC and returning the target UE location report to the LCS Client comprises:
   when a time period of the Periodical Deferred Location Request ends or a next time period thereof starts, and the H-GMLC is not in a state of waiting for the CN to return a location estimate of the target UE, notifying, by the H-GMLC, the CN via the V-GMLC to locate the target UE;
   cooperating, by the CN, with the RAN to locate the target UE to obtain the location estimate of the target UE, submitting the location estimate of the target UE and the Reference Number to the H-GMLC via the V-GMLC; and
   returning, by the H-GMLC, the location estimate of the target UE to the LCS Client via the R-GMLC.

10. The method of claim 2, wherein the submitting a target UE location report to the R-GMLC by the H-GMLC further comprises:
    providing, by the H-GMLC, the Reference Number for the R-GMLC.

11. The method of claim 10, wherein the returning the target UE location report to the LCS Client further comprises:
    providing, by the R-GMLC, the Reference Number for the LCS Client.

12. The method of claim 2, the Deferred Location Request sent by the LCS Client to the R-GMLC is a target UE Available Location Request;
the submitting a target UE location report and the Reference Number to the H-GMLC and returning the target UE location report to the LCS Client comprises:
when detecting that a specified event happens, cooperating, by the CN, with a Radio Access Network (RAN) to locate the target UE to obtain a location estimate of the target UE, and submitting the location estimate of the target UE and the Reference Number to the H-GMLC via the V-GMLC;
returning, by the H-GMLC, the location estimate of the target UE to the LCS Client via the R-GMLC.

13. The method of claim 2, wherein the Deferred Location Request sent by the LCS Client to the R-GMLC is a Periodical Location Request;
the submitting a target UE location report and the Reference Number to the H-GMLC and returning the target UE location report to the LCS Client comprises:
when a time period of a Periodical Location Request ends or a next time period thereof starts, notifying, by the H-GMLC, the CN via the V-GMLC to locate the target UE;
cooperating, by the CN, with the RAN to locate the target UE to obtain a location estimate of the target UE;
submitting, by the CN, the location estimate of the target UE and the Reference Number to the H-GMLC via the V-GMLC;
returning, by the H-GMLC, the location estimate of the target UE to the LCS Client via the R-GMLC.

14. The method of claim 2, wherein the Deferred Location Request sent by the LCS Client to the R-GMLC is a Periodical Deferred Location Request;
when a time period of the Periodical Deferred Location Request ends or a next time period thereof starts, and the H-GMLC is in a state of waiting for the CN to return a location estimate of the target UE, before submitting a Subscriber Location Report and the Reference Number to the H-GMLC via the V-GMLC by the CN, the method further comprises:
notifying, by the H-GMLC via the R-GMLC, the LCS Client that no location estimate of the target UE may be provided for the moment;
the submitting a target UE location report and the Reference Number to the H-GMLC and returning the target UE location report to the LCS Client comprises:
when detecting that a specified event happens, cooperating, by the CN, with the RAN to locate the target UE to obtain a location estimate of the target UE, submitting the location estimate of the target UE and the Reference Number to the H-GMLC via the V-GMLC;
returning, by the H-GMLC, the location estimate of the target UE to the LCS Client via the R-GMLC.

15. The method of claim 2, wherein the Deferred Location Request sent by the LCS Client to the R-GMLC is a Periodical Deferred Location Request;
the submitting a target UE location report and the Reference Number to the H-GMLC and returning the target UE location report to the LCS Client comprises:
when a time period of the Periodical Deferred Location Request ends or a next time period thereof starts, and the H-GMLC is in not a state of waiting for the CN to return a location estimate of the target UE, notifying, by the H-GMLC, the CN via the V-GMLC to locate the target UE;
cooperating, by the CN, with the RAN to locate the target UE to obtain the location estimate of the target UE, submitting the location estimate of the target UE and the Reference Number to the H-GMLC via the V-GMLC; and
returning, by the H-GMLC, the location estimate of the target UE to the LCS Client via the R-GMLC.

16. The method of claim 1, the Deferred Location Request sent by the LCS Client to the R-GMLC is a target UE Available Location Request;
the submitting a target UE location report and the Reference Number to the H-GMLC and returning the target UE location report to the LCS Client comprises:
when detecting that a specified event happens, cooperating, by the CN, with a Radio Access Network (RAN) to locate the target UE to obtain a location estimate of the target UE, and submitting the location estimate of the target UE and the Reference Number to the H-GMLC via the V-GMLC;
returning, by the H-GMLC, the location estimate of the target UE to the LCS Client via the R-GMLC.

17. The method of claim 1, wherein the Deferred Location Request sent by the LCS Client to the R-GMLC is a change of area type location request;
before submitting a target UE location report and the Reference Number to the H-GMLC via the V-GMLC by the CN, the method further includes:
sending, by the CN, a change of area type location request to the target UE;
the submitting a target UE location report and the Reference Number to the H-GMLC and returning the target UE location report to the LCS Client comprises:
when detecting a location area event happens, submitting, by the target UE, a location area event and the Reference Number to the CN;
submitting, by the CN, the location area event report and the Reference Number to the H-GMLC via the V-GMLC; and
returning, by the H-GMLC, the location area event report to the LCS Client via the R-GMLC.

18. The method of claim 17, wherein the change of area type Location Request sent by the LCS Client to the R-GMLC contains a location indication requesting location information of the target UE;
before returning a location area event report to the LCS Client, the method further comprises:
initiating, by the H-GMLC or the R-GMLC, a locating process for the target UE;
cooperating, by the CN, with the RAN to locate the target UE to obtain a location estimate of the target UE, submitting the location estimate of the target UE and the Reference Number to the H-GMLC via the V-GMLC; and
returning, by the H-GMLC, the location area event report of the target UE carrying the location estimate of the target UE to the LCS Client via the R-GMLC.

19. The method of claim 1, wherein the Deferred Location Request sent by the LCS Client to the R-GMLC is a Periodical Location Request;
the submitting a target UE location report and the Reference Number to the H-GMLC and returning the target UE location report to the LCS Client comprises:
when a time period of a Periodical Location Request ends or a next time period thereof starts, notifying, by the H-GMLC, the CN via the V-GMLC to locate the target UE;

cooperating, by the CN, with the RAN to locate the target UE to obtain a location estimate of the target UE;

submitting, by the CN, the location estimate of the target UE and the Reference Number to the H-GMLC via the V-GMLC;

returning, by the H-GMLC, the location estimate of the target UE to the LCS Client via the R-GMLC.

20. The method of claim 1, wherein the Deferred Location Request sent by the LCS Client to the R-GMLC is a Periodical Deferred Location Request;

when a time period of the Periodical Deferred Location Request ends or a next time period thereof starts, and the H-GMLC is in a state of waiting for the CN to return a location estimate of the target UE, before submitting a Subscriber Location Report and the Reference Number to the H-GMLC via the V-GMLC by the CN, the method further comprises:

notifying, by the H-GMLC via the R-GMLC, the LCS Client that no location estimate of the target UE may be provided for the moment;

the submitting a target UE location report and the Reference Number to the H-GMLC and returning the target UE location report to the LCS Client comprises:

when detecting that a specified event happens, cooperating, by the CN, with the RAN to locate the target UE to obtain a location estimate of the target UE, submitting the location estimate of the target UE and the Reference Number to the H-GMLC via the V-GMLC;

returning, by the H-GMLC, the location estimate of the target UE to the LCS Client via the R-GMLC.

21. The method of claim 20, wherein the notifying, by the H-GMLC via the R-GMLC, the LCS Client that no location estimate of the target UE may be provided for the moment further comprises:

providing, by the H-GMLC, the Reference Number for the LCS Client via the R-GMLC.

22. The method of claim 1, wherein the Deferred Location Request sent by the LCS Client to the R-GMLC is a Periodical Deferred Location Request;

the submitting a target UE location report and the Reference Number to the H-GMLC and returning the target UE location report to the LCS Client comprises:

when a time period of the Periodical Deferred Location Request ends or a next time period thereof starts, and the H-GMLC is not in a state of waiting for the CN to return a location estimate of the target UE, notifying, by the H-GMLC, the CN via the V-GMLC to locate the target UE;

cooperating, by the CN, with the RAN to locate the target UE to obtain the location estimate of the target UE, submitting the location estimate of the target UE and the Reference Number to the H-GMLC via the V-GMLC; and returning, by the H-GMLC, the location estimate of the target UE to the LCS Client via the R-GMLC.

* * * * *